United States Patent [19]

Kato

[11] Patent Number: 4,530,578

[45] Date of Patent: Jul. 23, 1985

[54] VARIABLE MAGNIFICATION OBSERVATION APPARATUS

[75] Inventor: Kinya Kato, Tokyo, Japan

[73] Assignee: Nippon Kogaku K. K., Tokyo, Japan

[21] Appl. No.: 608,820

[22] Filed: May 10, 1984

[30] Foreign Application Priority Data

May 16, 1983 [JP] Japan ............................ 58-85459

[51] Int. Cl.³ ................. G02B 21/12; G02B 5/14
[52] U.S. Cl. .......................... 350/526; 350/523; 350/519; 362/32
[58] Field of Search ............. 350/526, 523, 525, 528, 350/509, 519, 560, 574; 362/32

[56] References Cited

U.S. PATENT DOCUMENTS

| | | |
|---|---|---|
| 2,861,498 | 11/1958 | Klein ................................ 350/509 |
| 3,600,568 | 8/1971 | Weyrauch ....................... 350/523 |
| 3,637,282 | 4/1972 | Hayamizu et al. . | |
| 3,669,524 | 6/1972 | Shio ................................ 350/523 |
| 3,799,645 | 3/1974 | Stankewitz ..................... 350/526 |
| 3,833,283 | 9/1974 | Stankewitz ..................... 350/526 |
| 4,253,726 | 3/1981 | Taira ............................... 350/526 |
| 4,384,200 | 5/1983 | Taira ............................... 350/526 |
| 4,397,529 | 8/1983 | Taira ............................... 350/526 |

FOREIGN PATENT DOCUMENTS 2300968  7/1974  Fed. Rep. of Germany ...... 350/523

Primary Examiner—Jon W. Henry
Attorney, Agent, or Firm—Shapiro and Shapiro

[57] ABSTRACT

A variable magnification observation apparatus capable of changing the magnification thereof includes an optical fiber having an exit surface for emitting an illuminating light beam at an angle corresponding to a predetermined numerical aperture, an aperture stop member disposed near the exit surface of the optical fiber, a field stop member disposed at a predetermined distance from the aperture stop member, and a negative lens removably inserted in the optical path between the aperture stop member and the field stop member.

8 Claims, 8 Drawing Figures

VARIABLE MAGNIFICATION OBSERVATION APPARATUS

BACKGROUND OF THE INVENTION

1. Field of the Invention

This invention relates to a variable magnification observation apparatus having an illuminating optical system using an optical fiber.

2. Description of the Prior Art

Generally, in Köhler illumination, it is desirable that the light source be a surface light source. Therefore, if the image of the light source is formed on one end surface of a fiber, the other end surface of the fiber can be made into a secondary surface light source.

The typical optical systems thereof are shown in FIGS. 1 and 2 of the accompanying drawings. As shown, a field stop 3 and an object surface 7 are conjugate with respect to a collector lens 4 and a condenser lens 6, and an aperture stop 2 and the entrance pupil plane 5 of the condenser lens 6 are conjugate with respect to the collector lens 4. Generally, in a low magnification optical system, it is necessary to make the aperture stop small and make the field stop large, and in a high magnification optical system, vice versa. However, the light ray emerging from an optical fiber 1 does not have a uniform angle distribution but has directionality and therefore, as the angle between the end surface 1a of the optical fiber and the emergent light ray becomes deviated from the vertical to a certain degree or more, the quantity of light becomes sharply weaker. In the low magnification illuminating system of FIG. 1, due to such a characteristic of the fiber, the light ray 8 arriving at the marginal portion of the field stop 3 from the center of the fiber is weak as compared with the light ray 9 arriving at the center of the field stop, and where, as an extreme case, the angle of the light ray 8 is greater than the angular aperture (N.A.) of the light beam of the fiber 1, there is no light arriving at the marginal portion of the field stop and the marginal portion of the field of view becomes dark. That is, there is a disadvantage that illumination irregularity occurs. In the high magnification illuminating system of FIG. 2, illumination irregularity does not occur, but the light beam 10 of a great angle of emergence indicated by hatching is weak as compared with the light beams 11 and 11 emerging from the fiber end surface 1a perpendicularly thereto, and this has led to a disadvantage that the illuminating light cannot be efficiently utilized.

SUMMARY OF THE INVENTION

It is an object of the present invention to provide, in an illuminating system using an optical fiber, a variable magnification observation apparatus in which illumination irregularity is small and which can supply an illuminating light efficiently even during a great magnification change.

The variable magnification observation apparatus according to the present invention is of a construction in which a negative lens or a positive lens is removably inserted between the exit surface of an optical fiber for supplying an illuminating light and a field stop and the negative lens is disposed during low magnification and the positive lens is disposed during high magnification, in accordance with change-over of the observation magnification. That is, an aperture stop is disposed near the exit surface of the optical fiber between a condensing lens for condensing the light beam from the optical fiber and the exit surface of the optical fiber, and a field stop is disposed at a predetermined distance from the aperture stop toward the emergent light side thereof. During low magnification observation, the negative lens is disposed between the aperture stop and the field stop, and during high magnification observation, the positive lens is disposed near the aperture stop. Accordingly, in the illuminating system, change-over of three stages, i.e., the illumination for low magnification in which the negative lens is inserted, the illumination for high magnification in which the positive lens is inserted and the illumination for medium magnification in which no lens is inserted, is possible, and of these three stages, two stages can also be changed over as required.

The invention will become more fully apparent from the following detailed description thereof taken in conjunction with the accompanying drawings.

DESCRIPTION OF THE PREFERRED EMBODIMENT

Figure 1:
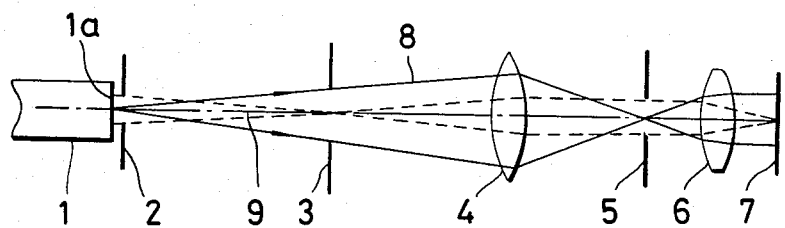
FIGS. 1 and 2 show the illuminating systems according to the prior art using an optical fiber, FIG. 1 being the optical path view of the low magnification illuminating system and FIG. 2 being the optical path view of the high magnification illuminating system.
Figure 2:
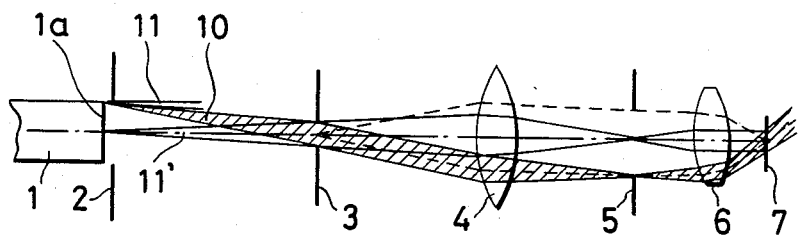
Figure 3A:
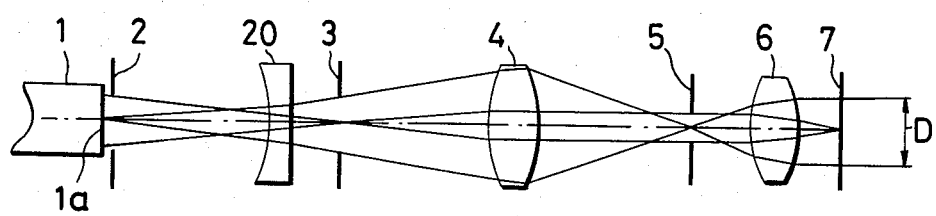
FIGS. 3A, 3B and 3C show the optical paths of the illuminating system of the apparatus according to the present invention in the illumination states for low magnification, medium magnification and high magnification, respectively.
Figure 3B:
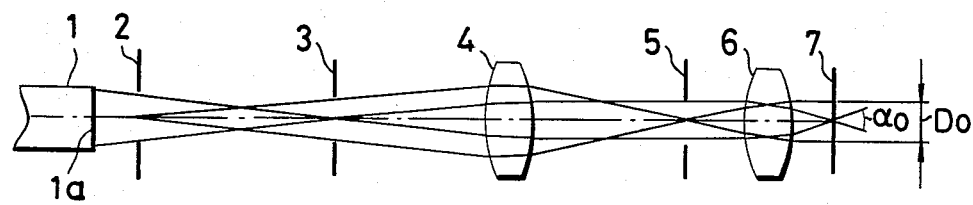
Figure 3C:
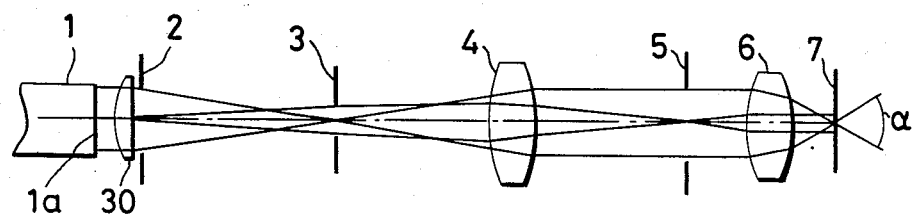

FIG. 3A is an optical path view showing the low magnification illumination state of the illuminating system according to the present invention, FIG. 3B is an optical path view showing the medium magnification illumination state singly by optical fiber, and FIG. 3C is an optical path view showing the high magnification illumination state of the illuminating system according to the present invention. In each of these Figures, light rays indicating the conjugate relations of an aperture stop and a field stop are shown. As shown in FIG. 3A, in the illumination state for low magnification, a negative lens 20 is disposed between an aperture stop 2 disposed near the exit surface 1a of an optical fiber 1 and a field stop 3 disposed at a predetermined distance from the aperture stop 2. By the diverging action of the negative lens 20, the light beam exiting from the optical fiber 1 diverges at an angle greater than the angular aperture (N.A.) inherent to the optical fiber 1 and can uniformly illuminate the large opening of the field stop 3 and therefore, by a condensing lens 4, an illuminating light beam of a great angle is supplied to the entrance pupil 5 of a condenser lens 6 and can uniformly illuminate the wide range D of the object surface 7 through the condenser lens 6. In the medium magnification state shown in FIG. 3B, the angle of opening of the light beam from the optical fiber 1 which illuminates the field stop 3 is limited by the angular aperture (N.A.) inherent to the optical fiber 1 and therefore, even if the opening of the field stop 3 is made large, no light beam exists in the marginal portion thereof and thus, only the narrow range $D_0$ of the object surface 7 can be illuminated.

Figure 4:
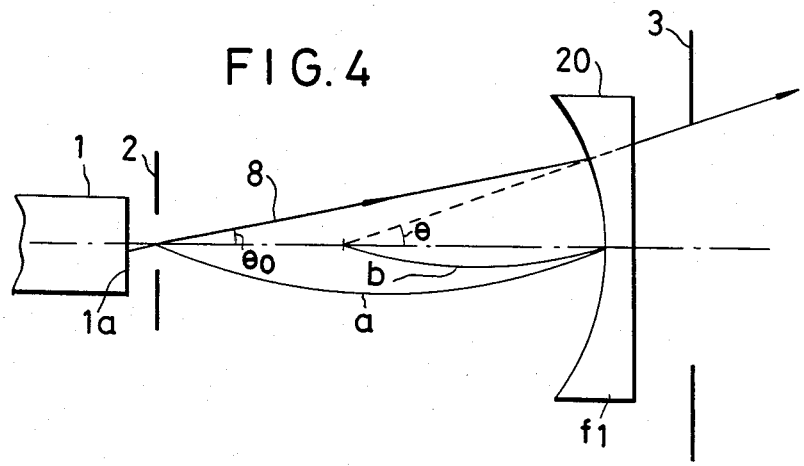
FIG. 4 illustrates the diverging action of a negative lens.

The diverging action of the negative lens 20 for low magnification will now be considered. As shown in the enlarged view of FIG. 4, a light ray 8 exiting at an angle $\theta_0$ from the exit surface $1a$ of the optical fiber 1 and passing through the center of the aperture stop 2 arrives at the rim of the field stop 3 at an angle $\theta$ due to the action of the negative lens 20. When the distance from the aperture stop 2 to the negative lens 20 is a and the distance from the point at which the light ray 8 exiting from the negative lens 20 intersects the optic axis (the position at which the aperture stop is to lie when the negative lens is absent) to the negative lens 20 is b (in the case of FIG. 4, $b<0$), $\theta>\theta_0>0$, and from the imaging relation of the lens, with respect to the focal length $f_1$ of the negative lens 20, the following equation is established:

$$1/a + 1/b = 1/f_1 \qquad (1)$$

and also, from the sine condition, the following equation is established:

$$a \sin \theta_0 = -b \sin \theta \qquad (2)$$

From equations (1) and (2), the following equation is derived:

$$\sin \theta_0 = \frac{f_1 - b}{f_1} \sin \theta. \qquad (3)$$

If the numerical aperture of the optical fiber used herein is N.A., to obtain uniform illumination, it is necessary that $$0 < \sin \theta_0 < N.A.$$

If within this range, the emergent light beam from the optical fiber can be regarded as being substantially uniform. Accordingly, from equation (3), $$0 < \frac{f_1 - b}{f_1} \sin \theta < N.A.$$

Consequently, it is necessary to satisfy the following condition:

$$\frac{b \sin \theta}{\sin \theta - N.A.} < f_1 < b \ (b < 0). \qquad (4)$$

By disposing a negative lens which satisfies condition (4), it becomes possible to uniformly illuminate the large range of the object surface as an illuminating system for low magnification. If $f_1$ becomes greater in the negative sense than the lower limit of this condition, the diverging action of the negative lens will be small and therefore, the field stop cannot be sufficiently illuminated up to the marginal portion thereof. If, conversely, $f_1$ becomes smaller in the negative sense beyond the upper limit of this condition, the diverging action of the negative lens will be too strong and therefore, most of the light beam will arrive at the outside of the opening of the field stop and thus, the illumination efficiency will be reduced. Further, the conjugate relation between the aperture stop to be positioned near the exit surface of the optical fiber and the entrance pupil of the condenser lens cannot be maintained.

Figure 5:
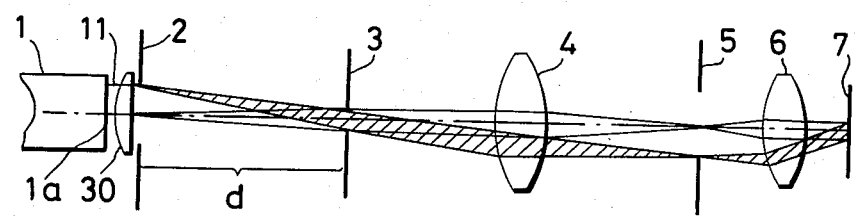
FIG. 5 illustrates the action of a positive lens.

The optical path of the illuminating system in the illumination state for high magnification according to the present invention is as shown in FIG. 3C. In FIG. 3C, members similar in function to those in the illumination state for low magnification shown in FIG. 3A are given similar reference numerals. In this case, a positive lens 30 is disposed immediately in front of the aperture stop 2 near the exit surface $1a$ of the optical fiber 1. As shown in FIG. 5, the light beam 11 perpendicularly exiting from the wide range of the exit surface $1a$ of the optical fiber 1 is subjected to the converging action of the positive lens 30 and arrives substantially at the central portion of the field stop 3 having a relatively small opening and therefore is efficiently condensed on the narrow object surface 7 for high magnification. That is, as shown in FIG. 3C, the light beam from the marginal portion of the optical fiber 1 is directed to the opening of the field stop 3 at a great angle by the converging action of the positive lens 30 and therefore can uniformly illuminate the large range of the entrance pupil 5 of the condenser lens 6 and as a result, it can illuminate the object surface 7 at a great angle $\alpha$. Accordingly, high magnification illumination is accomplished at an angle $\alpha$ greater than the angle $\alpha_0$ of the illuminating light in the illumination state of medium magnification shown in FIG. 3B and moreover efficiently. Generally, in the illumination state for high magnification, the opening of the aperture stop 2 is larger than the opening of the field stop 3 and therefore, if the focal length of the positive lens 30 is $f_2$, it is desirable that $f_2$ be in the following relation with respect to the spacing d between the aperture stop 2 and the field stop 3:

$$d \leq f_2 \leq 2.5 d \qquad (5).$$

The focal length $f_2$ of the positive lens must be chosen at an appropriate value within the range of the above-mentioned condition from the relation between the aperture of the aperture stop and the aperture of the field stop. If the range of the above-mentioned condition is departed from, it will be difficult to effect efficient high magnification illumination.

Figure 6:
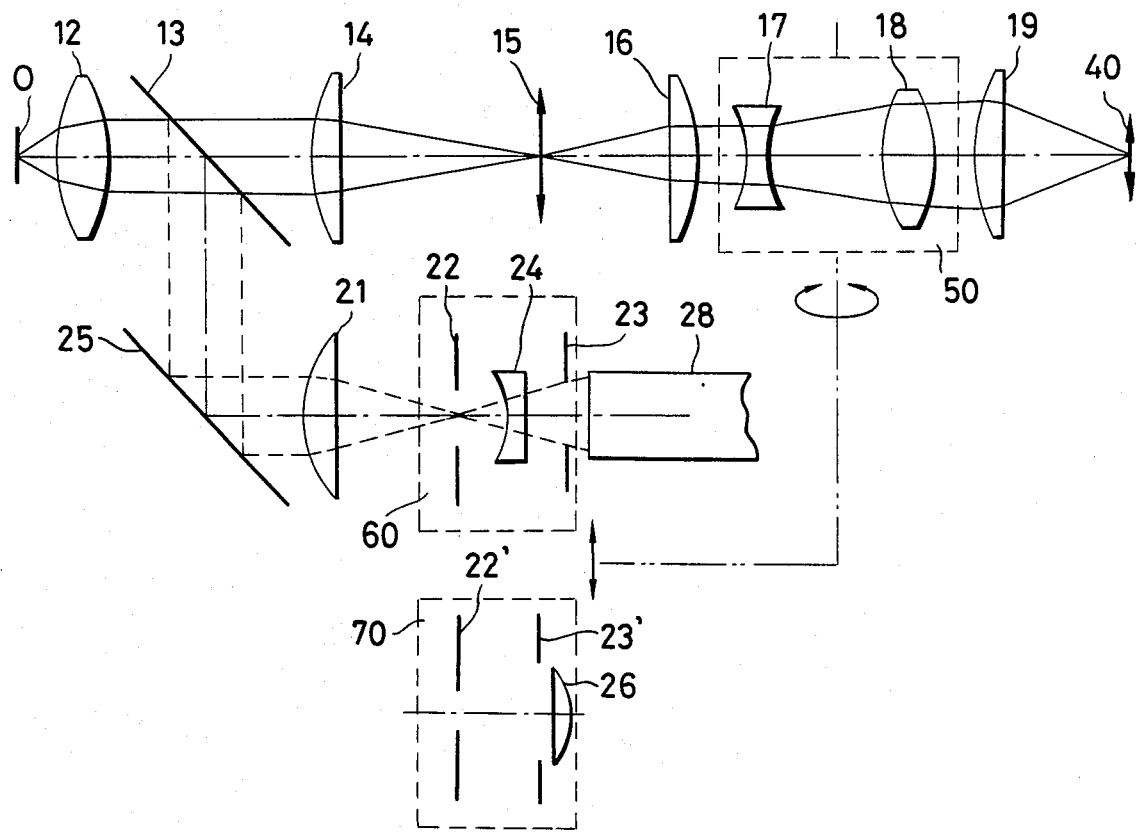
FIG. 6 shows the optical path of an embodiment of the present invention.

FIG. 6 shows the optical path of an embodiment of the present invention. This embodiment constitutes a variable magnification optical system having a falling illuminating system. The light beam from an object 0 from an intermediate image 15 via a first objective lens 12, a half-mirror 13 and a second objective lens 14. Lenses 16–19 constitute a relay optical system including Galileian magnification changing system 17, 18 and can change the magnification by rotating a rotatable barrel 50 having the Galileian magnification changing system 17, 18 by 180° about an axis of rotation perpendicular to the optic axis. By this relay optical system, the intermediate image 15 is re-imaged as a second intermediate image 40. The shown state is a low magnification observation state in which the intermediate image 15 is reduced by the Galileian magnification changing system and the second intermediate image 40 is formed. In the illuminating system of the present apparatus, during low magnification, a negative lens 24 is disposed near the exit surface of an optical fiber 28 and between an aperture stop 23 and a field stop 22 and on the other hand, during high magnification, a positive lens 26 is disposed in front of an aperture stop 23'. The light beam passed through the aperture stop 23 passes through the field stop 22 and through a collector lens 21 and illuminates the object O via a mirror 25, the half-mirror 13 and the first objective lens 12.

The negative lens 24 is integrally provided with the aid of a support member 60 while satisfying condition (4), and the positive lens 26, the aperture stop 23' for high magnification illumination and the field stop 22' are integrally provided with the aid of a support member 70 while satisfying condition (5). In response to rotation of the rotatable barrel 50 of the Galileian magnification changing system, the two support members 60 and 70 having the aperture stop, the field stop and the lens are alternately removably inserted into the illuminating system and optimum illuminating light is supplied during high magnification observation and during low magnification observation.

The present embodiment is designed such that with the change-over of the high magnification and low magnification illuminating systems, the aperture stop 23, 23' and the field stop 22, 22' are interchanged at a time together with the positive lens and the negative lens, but the position of the field stop 22, 22' is always fixed and therefore, design may also be made such that during the interchange of the positive lens and the negative lens, only the aperture stop 23, 23' is interchanged and only the diameter of the opening of the field stop 22, 22' is changed.

The above-described embodiment is of such a design that two-stage change-over, i.e., change-over between low magnification and high magnification, is effected, but if the Galileian magnification changing system is rotated by 90° from the state of FIG. 6, medium magnification can be obtained and at this time, by disposing no lens between the exit surface of the optical fiber 28 and the collector lens in the illuminating system as shown in FIG. 3B or by disposing another lens therebetween, the optimum illumination state for medium magnification can be obtained and thus, substantially three-stage change-over can be effected. It is also possible to make a two-stage change-over design using only one of a higher magnification and a lower magnification with this medium magnification as the reference. Also, the present invention is sufficiently effective not only in the falling illuminating system as shown in FIG. 6 but also in a transmitting illuminating system, and in the falling illuminating system, the objective lens of course serves also as a condenser lens.

According to the present invention, as described above, in an observation apparatus in which illuminating light is supplied by an optical fiber, an excellent illumination state free of illumination irregularity can always be efficiently obtained even if the magnification of the observation system is greatly changed, and the optical fiber can be used most effectively without its convenience being injured.

I claim:

1. A variable magnification observation apparatus capable of changing the magnification thereof, including:
   an optical fiber having an exit surface for emitting an illuminating light beam at an angle corresponding to a predetermined numerical aperture;
   an aperture stop member disposed near the exit surface of said optical fiber;
   a field stop member disposed at a predetermined distance from said aperture stop member; and
   a negative lens removably inserted in the optical path between said aperture stop member and said field stop member.

2. A variable magnification observation apparatus according to claim 1, satisfying the following condition:

$$\frac{b \sin \theta}{\sin \theta - N.A.} < f_1 < b \ (b < 0)$$

where $f_1$ is the focal length of said negative lens, N.A. is the numerical aperture of said optical fiber, $\theta$ is the angle formed by the light ray exiting from said negative lens with the optic axis, and b is the distance from the position whereat the light ray exiting from said negative lens intersects the optic axis to said negative lens.

3. A variable magnification observation apparatus according to claim 2, further including a positive lens removably inserted in the optical path near said aperture stop member in a state in which said negative lens has been removed out of the optical path.

4. A variable magnification observation apparatus according to claim 3, satisfying the following condition:

$$d \leq f_2 \leq 2.5 \ d$$

where $f_2$ is the focal length of said positive lens, and d is the spacing between said aperture stop member and said field stop member.

5. A variable magnification optical system capable of always efficiently supplying the illuminating light beam from an optical fiber to an object surface, including:
   an objective lens;
   magnification change-over means for changing the size of the object image by said objective lens; and
   first and second illuminating means removably inserted in an illuminating optical path in accordance with the magnification change by said magnification change-over means;
   said first illuminating means having an aperture stop disposed near the exit surface of said optical fiber, a field stop disposed at a predetermined distance from said aperture stop, and a negative lens disposed between said aperture stop and said field stop;
   said second illuminating means having another aperture stop disposed near the exit surface of said optical fiber, and a positive lens disposed near said another aperture stop.

6. A variable magnification optical system according to claim 5, wherein said negative lens causes the emergent light beam from said optical fiber to diverge and thereby supplies the light beam to the entire opening of said field stop.

7. A variable magnification optical system according to claim 6, wherein said positive lens converges the light ray emerging from the marginal portion of the exit surface of said optical fiber and causes said light ray to pass substantially through the center of the opening of said field stop.

8. A variable magnification optical system according to claim 7, wherein said magnification change-over means has a Galilean magnification changing system provided for rotation about an axis of rotation perpendicular to the optic axis of said objective lens, and said first and second illuminating means are alternately removably inserted in the illuminating optical path in response to rotation of said Galilean magnification changing system.

* * * * *